(12) United States Patent
Koliwad et al.

(10) Patent No.: US 12,149,156 B1
(45) Date of Patent: Nov. 19, 2024

(54) BIPOLE POWER TRANSMISSION SCHEMES

(71) Applicant: GE INFRASTRUCTURE TECHNOLOGY LLC, Greenville, SC (US)

(72) Inventors: Ajay Koliwad, Oreland, PA (US); Madhusudan Nandula, Stafford (GB); Neil Cuthbert, Stafford (GB); Markus Andre Offergeld, Constance (DE)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 16 days.

(21) Appl. No.: 18/352,586

(22) Filed: Jul. 14, 2023

(51) Int. Cl.
*H02J 3/36* (2006.01)
*H02M 1/00* (2006.01)

(52) U.S. Cl.
CPC ............ *H02M 1/0012* (2021.05); *H02J 3/36* (2013.01)

(58) Field of Classification Search
CPC ............................... H02J 3/36; H02M 1/0012
See application file for complete search history.

(56) References Cited

U.S. PATENT DOCUMENTS

| | | | |
|---|---|---|---|
| 2010/0150175 A1* | 6/2010 | Bjorklund | H02J 13/00019 370/475 |
| 2010/0157633 A1* | 6/2010 | Bjorklund | H02M 5/4505 363/74 |
| 2017/0351249 A1* | 12/2017 | Oh | H02J 3/36 |
| 2018/0366942 A1 | 12/2018 | Gupta et al. | |
| 2021/0249864 A1 | 8/2021 | Upadhyay | |
| 2023/0082909 A1 | 3/2023 | Barker et al. | |
| 2023/0140103 A1 | 5/2023 | Babu et al. | |
| 2023/0223759 A1 | 7/2023 | Babu et al. | |

FOREIGN PATENT DOCUMENTS

KR  20150122907 A * 11/2015 ................ H02J 3/36

OTHER PUBLICATIONS

Machine translation of KR-20150122907-A, Nov. 3, 2015. Obtained from internal USPTO database on Sep. 23, 2024. (Year: 2015).*

* cited by examiner

*Primary Examiner* — Fred E Finch, III
(74) *Attorney, Agent, or Firm* — Eversheds-Sutherland (US) LLP

(57) ABSTRACT

A bipole power transmission scheme includes at least a first converter station that is positioned in-use separate from at least a second converter station, and at least first and second transmission conduits and a first return conduit to in-use interconnect the first converter station with the second converter station and thereby permit the transfer of power between the first and second converter stations.

12 Claims, 3 Drawing Sheets

BIPOLE POWER TRANSMISSION SCHEMES

TECHNICAL FIELD

This invention relates to a bipole power transmission scheme and to a method of operating such a scheme.

BACKGROUND

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e., the transmission line or cable, and reduces the cost per kilometer of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e., power converters) are required at each interface between AC and DC power to affect the required conversion from AC to DC or from DC to AC.

The choice of the most suitable HVDC power transmission scheme within a HVDC power transmission network differs, depending on the application and scheme features. One type of such scheme, i.e., network configuration, is a bipole power transmission scheme which can include two terminal, two terminal dual (i.e., parallel bipole), and four terminal configurations.

SUMMARY

According to a first aspect of the invention there is provided a bipole power transmission scheme comprising at least a first converter station positioned in-use separate from at least a second converter station, and at least first and second transmission conduits and a first return conduit to in-use interconnect the first converter station with the second converter station and thereby permit the transfer of power between the first and second converter stations, the first converter station including:
  a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
  a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
  a first digital controller running an active instance of the first converter control function;
  a second digital controller running a standby instance of the first converter control function;
  a third digital controller running an active instance of the second converter control function; and
  a fourth digital controller running a standby instance of the second converter control function,
  one of the first, second, third and fourth digital controllers additionally running an active instance of a first converter station control function which generates station control data to control operation of the first converter station, and another of the first, second, third and fourth digital controllers additionally running a standby instance of the first converter station control function,
  the first, second, third and fourth digital controllers being interconnected with one another by a communication interface whereby the first digital controller is able to share active first converter operational data with each of the other digital controllers, the second digital controller is able to share standby first converter operational data with each of the other digital controllers, the third digital controller is able to share active second converter operational data with each of the other digital controllers, and the fourth digital controller is able to share standby second converter operational data with each of the other digital controllers,
  wherein each of the digital controllers running an active instance of a converter control function is configured to import the active operational data of the other digital controller running an active instance of a converter control function, and
  each of the digital controllers running a standby instance of a converter control function is configured to import the active operational data of each of the digital controllers running an active instance of a converter control function.

Having the digital controllers that are running an active instance of a converter control function, i.e. the respective active instances of the first converter control function and the second converter control function, configured to import the active operational data of the other such digital controller means that each such active digital controller, i.e. each of the first and third digital controllers, has access to the both the active first converter operational data and the active second converter operational data, i.e. operational data on how each of the first and second power converters is expected to be operating according to the active instance of the corresponding first or second converter control function.

Meanwhile, including digital controllers that are running a standby instance of a converter control function, i.e. the respective standby instances of the first converter control function and the second converter control function, which are configured to import the active operational data of each of the digital controllers running an active instance of a converter control function, i.e. the active operational data of each of the first and third digital controllers, means that each such standby digital controller similarly has access to the both the active first converter operational data and the active second converter operational data without being unnecessarily troubled with the other, standby operational data.

This is beneficial since overall it means that each digital controller has access to both the active first converter operational data and the active second converter operational data, and thus each of the active and standby instance of the first converter station control function additionally running on a respective one of each of the first, second, third and fourth digital controllers also has access to both the active first converter operational data and the active second converter operational data, i.e. access to the operational data on how each of the first and second power converters is expected to be operating according to the active instance of the corresponding first or second converter control function.

Preferably each of the digital controllers running an active instance of a converter control function is also configured to import the standby operational data of the standby instance of the same converter control function.

Such an arrangement is advantageous because the standby operational data of the standby instance includes information about converter output and general health which helps facilitate a smooth change over to the standby instance, e.g. if the active instance was to fail.

Optionally the digital controller running the active instance of the first converter station control function generates station control data in the form of active first converter control data and active second converter control data that the first and second power converters are respectively required to follow, and the digital controller running the standby instance of the first converter station control function generates station control data in the form of standby first converter control data and standby second converter control data, and the digital controller running the active instance of the first converter station control function shares via the communication interface its generated active first converter control data and active second converter control data with each of the other digital controllers, and the digital controller running the standby instance of the first converter station control function shares via the communication interface its generated standby first converter control data and standby second converter control data with each of the other digital controllers.

Sharing the active first and second converter control data and the standby first and second converter control data makes this data available to all digital controllers, and thereby also to the active and standby instances of the first converter station control function additionally running on those digital controllers.

In a preferred embodiment of the invention the digital controller running the active instance of the first converter station control function is configured to import the standby converter control data for the power converter it is running a converter control function for.

This is advantageous because the standby converter control data includes information about converter output and general health which helps facilitate a smooth change over to the standby instance, e.g. if the active instance was to fail.

In another preferred embodiment of the invention at least one of the first, second, third and fourth digital controllers additionally runs a deep standby instance of the first converter station control function, the or each digital controller running a deep standby instance of the first converter station control function generating station control data in the form of deep standby first converter control data and deep standby second converter control data, and the or such digital controller supressing their respective generated deep standby first converter control data and deep standby second converter control data.

Having the or each digital controller running a deep standby instance of the first converter control function supress, i.e. hold back and not share, their generated control data beneficially reduces the data passing through the communication interface and thus reduces the bandwidth required as well as any subsequent filtering by downstream processes that might otherwise have been needed to remove one or more of the deep standby first converter control data and the deep standby second converter control data.

In a still further preferred embodiment of the invention the digital controllers running the standby instance of the first converter station control function and the or each deep standby instance of the first converter station control function is each configured to import the active and standby converter control data for the power converter it is running a converter control function for.

This is beneficial because tracking each of the active and standby converter control data helps to ensure a seamless changeover and continuity of the converter operation without any glitch, e.g. in the event of a respective corresponding instance failure.

The digital controllers running the standby instance of the first converter station control function and the or each deep standby instance of the first converter station control function may each be configured to utilise the imported active converter control data for subsequent processing.

Again, this usefully helps to ensure a seamless changeover and continuity of the converter operation, e.g. in the event of a respective corresponding instance failure.

Preferably one of the first, second, third and fourth digital controllers additionally runs an active instance of a master power control function which generates power control data to in-use control the power exchanged by the first converter station, and another of the first, second, third and fourth digital controllers additionally runs a standby instance of the master power control function.

The inclusion of active and standby instances of a master power control function desirably provides a degree of redundancy in the bipole power transmission scheme of the invention, e.g. in the event of the active instance of the master power control function failing or otherwise running erroneously the standby instance can be deployed to take over control of the power exchanged by the first converter station.

Optionally the digital controller running the active instance of the master power control function generates power control data in the form of active first converter power control data, active second converter power control data, active third converter power control data, and active fourth converter power control data that the first and second power converters and third and fourth power converters in a second converter station are respectively required to follow, and the digital controller running the standby instance of the master power control function generates power control data in the form of standby first converter power control data, standby second converter power control data, standby third converter power control data, and standby fourth converter power control data.

Preferably the digital controller running the active instance of the master power control function shares via an inter-station communication interface its generated active first converter power control data, active second converter power control data, active third converter power control data, and active fourth converter power control data with each of the other digital controllers and further corresponding digital controllers in the second converter station, and the digital controller running the standby instance of the master power control function shares via the inter-station communication interface its generated standby first converter power control data, standby second converter power control data, standby third converter power control data, and standby fourth converter power control data with each of the other digital controllers and the further corresponding digital controllers in the second converter station.

Sharing the active first, second, third and fourth converter power control data and the standby first, second, third and fourth converter power control data makes this data available, via the inter-station communication interface, to all digital controllers, and thereby also to all of the corresponding active, standby, and deep standby instances of the first converter station control function additionally running on those digital controllers.

Optionally at least one of the first, second, third and fourth digital controllers additionally runs a deep standby instance of the master power control function, the or each digital controller running a deep standby instance of the master power control function generating power control data in the form of deep standby first converter power control data, deep standby second converter power control data, deep standby third converter power control data, and deep standby fourth converter power control data, the or each such digital controller supressing their respective generated deep standby first converter power control data, deep standby second converter power control data, deep standby third converter power control data, and deep standby fourth converter power control data.

Having the or each digital controller running a deep standby instance of the first converter control function supress, i.e. hold back and not share, their generated power control data beneficially reduces the data passing through the inter-station communication interface and thus reduces the bandwidth required as well as any subsequent filtering by downstream processes that might otherwise have been needed to remove one or more of the deep standby first converter power control data and the deep standby second converter power control data.

According to a second aspect of the invention there is provided a method of operating a bipole power transmission scheme comprising at least a first converter station positioned in-use separate from at least a second converter station, and at least first and second transmission conduits and a first return conduit to in-use interconnect the first converter station with the second converter station and thereby permit the transfer of power between the first and second converter stations, the first converter station including:
a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
a first digital controller running an active instance of the first converter control function;
a second digital controller running a standby instance of the first converter control function;
a third digital controller running an active instance of the second converter control function; and
a fourth digital controller running a standby instance of the second converter control function,
one of the first, second, third and fourth digital controllers additionally running an active instance of a first converter station control function which generates station control data to control operation of the first converter station, and another of the first, second, third and fourth digital controllers additionally running a standby instance of the first converter station control function,
the first, second, third and fourth digital controllers being interconnected with one another by a communication interface whereby the first digital controller is able to share active first converter operational data with each of the other digital controllers, the second digital controller is able to share standby first converter operational data with each of the other digital controllers, the third digital controller is able to share active second converter operational data with each of the other digital controllers, and the fourth digital controller is able to share standby second converter operational data with each of the other digital controllers,
the method of the invention comprising the steps of:
(a) configuring each of the digital controllers running an active instance of a converter control function to import the active operational data of the other digital controller running an active instance of a converter control function, and
(b) configuring each of the digital controllers running a standby instance of a converter control function to import the active operational data of each of the digital controllers running an active instance of a converter control function (48, 56).

The method of the invention shares the benefits of the corresponding features of the bipole power transmission scheme of the invention.

It will be appreciated that the use of the terms "first" and "second", and the like, in this patent specification is merely intended to help distinguish between similar features (e.g., the first and second transmission conduits, and the first and second power converters), and is not intended to indicate the relative importance of one feature over another feature, unless otherwise specified.

Within the scope of this application, it is expressly intended that the various aspects, embodiments, examples, and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
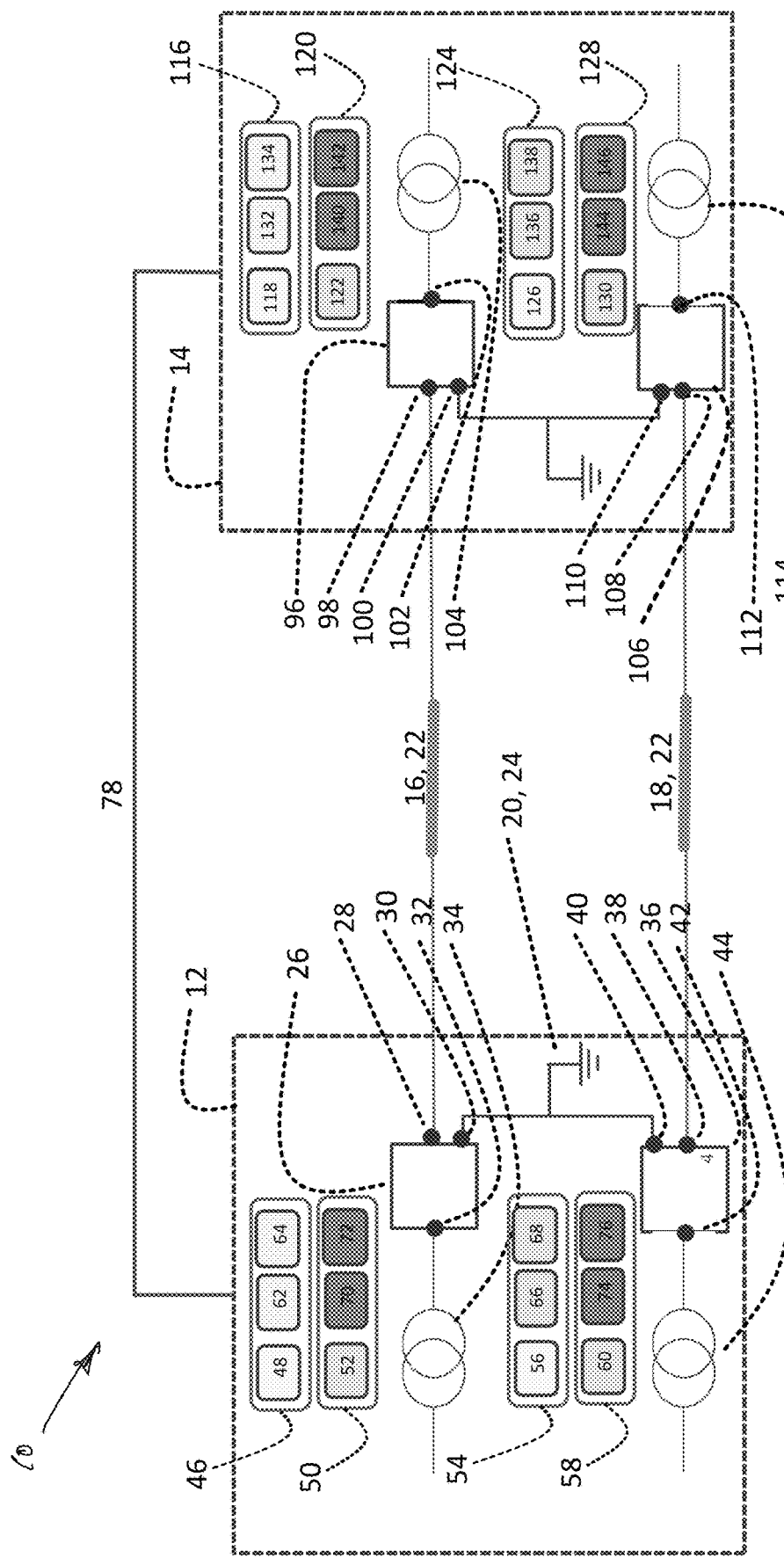
FIG. 1 shows a schematic view of a bipole power transmission scheme having a two terminal configuration according to a first embodiment of the invention.

A bipole power transmission scheme according to a first embodiment of the invention is designated generally by reference numeral 10, as shown in FIG. 1.

The bipole power transmission scheme 10, i.e., bipole power transmission network, includes first and second converter stations 12, 14 that are positioned separately from one another.

The first and second converter stations 12, 14 are interconnected by first and second transmission conduits 16, 18, i.e., first and second 'poles' (hence the scheme constituting a 'bipole' scheme, and more particularly a 'two terminal bipole' scheme), as well as a first return conduit 20, to permit the transfer of power between the first and second converter stations 12, 14.

Each of the first and second transmission conduits 16, 18 is or includes an overhead line 22, although in other embodiments of the invention one or other transmission conduit might be, or include, an underground cable, a subsea cable, or a mixture of such cables and line. Additionally, the first return conduit 20 is or includes an earth return 24, although a dedicated electrical conductor, e.g., a dedicated metallic return, may be used instead.

Moreover, in the embodiment shown the bipole power transmission scheme 10 of the invention includes both the first and second converter stations 12, 14, but other embodiments of the invention may include only the first converter station 12. Such other embodiments of the invention may be applicable when a third party owns or manages the second converter station and the downstream power transmission network associated therewith, and it is intended for the bipole power transmission scheme of the invention to interoperate with such a second converter station and associated power transmission network.

Returning to the embodiment shown, the first converter station 12 includes a first power converter 26 which has a first DC terminal 28 that is connected with the first transmission conduit 16, a second DC terminal 30 that is connected with the first return conduit 20, i.e. the earth return 24, and three first AC terminals 32 (only one of which is shown for simplicity) which, in use, are connected with a first, three-phase AC network element 34 such as, e.g. a first three-phase AC power supply. Other embodiments of the invention may have fewer than or more than three first AC terminals depending on the number of phases utilised by the first AC network element.

The first converter station 12 also includes a second power converter 36 that has a third DC terminal 38 which is connected with the first return conduit 20, a fourth DC terminal 40 which is connected with the second transmission conduit 18, and three second AC terminals 42 (although this can again vary in other embodiments of the invention) that, in use, are connected with a second, three-phase AC network element 44 such as, e.g. a second three-phase AC power supply.

Operation of the first power converter 26 to transfer power between the first transmission conduit 16 and the first AC network element 34 is controlled by a first converter control function, while operation of the second power converter 36 to transfer power between the second transmission conduit 18 and the second AC network element 44 is controlled by a second converter control function.

In that regard, the first converter station 12 also includes a first digital controller 46 that is running an active instance of the first converter control function 48, i.e., is running a version of the first converter control function that under normal conditions is in control of the operation of the first power converter 26.

The first converter station 12 also includes a second digital controller 50 which is running a standby instance of the first converter control function 52. The standby instance of the first converter control function 52, while always running on the second digital controller 50 does not normally control operation of the first power converter 26, that being taken care of by the active instance of the first converter control function 48 which is running of the first digital controller 46. However, the standby instance of the first converter control function 52 is immediately ready to take over control of the first power converter 26, e.g. in the event of a problem with the running of the active instance of the first converter control function 48.

Additionally, the first converter station 12 also includes a third digital controller 54 that is running an active instance of the second converter control function 56, i.e., is running a version of the second converter control function that under normal conditions is in control of the operation of the second power converter 36.

The first converter station 12 also includes a fourth digital controller 58 which is running a standby instance of the second converter control function 60. Again, similarly, the standby instance of the second converter control function 60, while always running on the fourth digital controller 58 does not normally control operation of the second power converter 36, that being taken care of by the active instance of the second converter control function 56 which is running of the third digital controller 54. However, as above, the standby instance of the second converter control function 60 is immediately ready to take over control of the second power converter 36, e.g. similarly in the event of a problem with the running of the active instance of the second converter control function 56.

The first, second, third and fourth digital controllers 46, 50, 54, 58 are part of a digital control system that is a combination of a modular hardware platform and associated application software which has a compact footprint.

In addition to the foregoing, one of the first, second, third and fourth digital controllers 46, 50, 54, 58 additionally runs an active instance of a first converter station control function 62. Such a first converter station control function, in use, generates station control data to control operation of the first converter station 12, while the aforementioned active instance of the first converter station control function 62 is the version of the second converter control function that under normal conditions is in control of the first converter station 12.

One of the first, second, third and fourth digital controllers 46, 50, 54, 58 also additionally runs an active instance of a master power control function 64 which, in-use, generates power control data to control the power exchanged by the first converter station 12, i.e., the power the first converter station 12 exchanges with the second converter station 14. Such an active instance again, similarly, is the version of the master power control function that under normal conditions is in control of the overall power exchanged by the first converter station 12 with the second converter station 14.

More particularly, a single one of the first, second, third and fourth digital controllers 46, 50, 54, 58 runs the active instances of the first converter station and master power control functions 62, 64, and more particularly still in the embodiment shown the first digital controller 46 runs the said active instances of the first converter station and master power control functions 62, 64. In other embodiments of the invention (not shown) such active instances may be run by one or more of the other digital controllers.

Furthermore, one of the first, second, third and fourth digital controllers 46, 50, 54, 58 additionally runs a standby instance of the first converter station control function 66, and one of the first, second, third and fourth digital controllers 46, 50, 54, 58 additionally runs a standby instance of the master power control function 68.

Such standby instances of the first converter station control function 66 and the master power control function 68, while similarly always running, do not normally control the associated operation of the first converter station 12, such control being taken care of by the active instances of those control functions 62, 64. However, as above, each of the standby instance of the first converter station control function 66 and the standby instance of the master power control function 68 is immediately ready to take over the associated control of the first converter station 12 from the corresponding active instance of the first converter station and master power control functions 62, 64, e.g. in the event of a problem with the running of either such active instances 62, 64.

More particularly, a single one of the first, second, third and fourth digital controllers 46, 50, 54, 58 runs the standby instances of the first converter station and master power control functions 66, 68, and more particularly still the third digital controller 54 runs the standby instances of the first converter station and master power control functions 66, 68. In other embodiments of the invention (not shown) such standby instances may be run by one or more of the other digital controllers.

In any event, the digital controller running the standby instances of the first converter station control function 66 and the master power control function 68, i.e., the third digital controller 54, is different to the digital controller running the active instances of the first converter station control function 62 and the master power control function 64, i.e. is different to the first digital controller 46.

Further to the above, one of the first, second, third and fourth digital controllers 46, 50, 54, 58 additionally runs a first deep standby instance of the first converter station control function 70, and one of the first, second, third or fourth digital controllers 46, 50, 54, 58 additionally runs a first deep standby instance of the master power control function 72.

More particularly, a single one of the first, second, third and fourth digital controllers 46, 50, 54, 58 runs the first deep standby instances of the first converter station and master power control functions 70, 72, and more particularly still the second digital controller 50 runs the first deep standby instances of the first converter station and master power control functions 70, 72. In other embodiments of the invention (not shown) such first deep standby instances may be run by one or more of the other digital controllers.

In any event, while the first deep standby instances of the first converter station control function 70 and the master power control function 72, are always running, they do not normally control the associated operation of the first converter station 12, such normal control being taken care of by the active instances of those control functions 62, 64.

Moreover, nor will either of the first deep standby instances of the first converter station and master power control functions 70, 72 ordinarily take over from the corresponding active instances of those control functions 62, 64 in the event of a problem with either of those active instances 62, 64. Rather, as set out above, the corresponding standby instance of the first converter station control function and the master power control function 66, 68 is immediately ready to take over the associated control of the first converter station 12 from the corresponding active instance of the first converter station and master power control functions 62, 64.

Instead, each of the first deep standby instance of the first converter station control function 70 and the first deep standby instance of the master power control function 72 is immediately ready to take over the associated control of the first converter station 12 from the corresponding standby instance of the first converter station and master power control functions 66, 68, e.g. in the event of a problem first of all with the running of either of the active instances of those functions 62, 64, and then a subsequent problem secondly with the running of a corresponding one of the standby instances of the first converter station and master power control functions 66, 68. In other words, by way of example, the first deep standby instance of the first converter station control function 70 only takes over the associated control of the first converter station 12 in the event, firstly, of there being a problem running the active instance of the first converter station control function 62 and then, secondly, there being a problem with the running of the standby instance of the first converter control function 66.

The digital controller, i.e. the second digital controller 50, running the first deep standby instances of the first converter station and the master power control functions 70, 72 is different to the digital controller, i.e., the first digital controller 46 running the active instances of the first converter station and the master power control functions 62, 64, and to the digital controller, i.e., the third digital controller 54, running the standby instances of the first converter station and the master power control functions 66, 68.

Finally in relation to the first converter station 12, one of the first, second, third and fourth digital controllers 46, 50, 54, 58 additionally runs a second deep standby instance of the first converter station control function 74, and one of the first, second, third or fourth digital controllers 46, 50, 54, 58 additionally runs a second deep standby instance of the master power control function 76.

More particularly, a single one of the first, second, third and fourth digital controllers 46, 50, 54, 58 runs the second deep standby instances of the first converter station and master power control functions 74, 76, and more particularly still the fourth digital controller 58 runs the second deep standby instances of the first converter station and master power control functions 74, 76.

Although always running, neither the second deep standby instance of the first converter station control function 74 nor the second deep standby instance of the master power control function 76 is normally in associated control of the first converter station 12. Each such second deep standby instance 74, 76 is, however, immediately ready to take over the associated control of the first converter station 12 from the corresponding first deep standby instance of the first converter station and master power control functions 70, 72, e.g. in the event of a problem with the running of either of the first deep standby instances of the first converter station and master power control functions 70, 72 (i.e. following a problem with the running of either of the active instances of those functions 62, 64, and then a subsequent problem with the running of a corresponding one of the standby instances of the first converter station and master power control functions 66, 68).

In the foregoing manner, the digital controller, i.e. the fourth digital controller 58, running the second deep standby instances of the first converter station and master power control functions 74, 76 is different to the digital controller, i.e. the first digital controller 46, running the active instances of the first converter station and master power control functions 62, 64, different to the digital controller, i.e. third digital controller 54, running the standby instances of the first converter station and master power control functions 66, 68, and different to the digital controller, i.e. the second digital controller 50, running the first deep standby instances of the first converter station and master power control functions 70, 72.

Meanwhile, the second converter station 14 includes a third power converter 96 which has a fifth DC terminal 98 that is connected with the first transmission conduit 16, a sixth DC terminal 100 that is connected with the first return conduit 20, and three third AC terminals 102 (although this can differ in other embodiments) which, in use, are connected with a third, three-phase AC network element 104 such as, e.g. a first AC distribution network.

The second converter station 14 also includes a fourth power converter 106 that has a seventh DC terminal 108 which is connected with the first return conduit 20, an eighth DC terminal 110 which is connected with the second transmission conduit 18, and three fourth AC terminals 112 (although, again, this can vary in other embodiments) that, in use, are connected with a fourth, three-phase AC network element 114 such as, e.g. a second AC distribution network.

Operation of the third power converter 96 to transfer power between the first transmission conduit 16 and the third AC network element 104 is controlled by a third converter control function, while operation of the fourth power converter 106 to transfer power between the second transmission conduit 18 and the fourth AC network element 114 is controlled by a fourth converter control function.

In a similar, albeit mirrored, configuration to the first converter station 12, the second converter station 14 includes a fifth digital controller 116 that is running an active instance of the third converter control function 48, i.e., is running a version of the third converter control function that under normal conditions is in control of the operation of the third power converter 96.

The second converter station 14 also includes a sixth digital controller 120 which is running a standby instance of the third converter control function 52, a seventh digital controller 124 that is running an active instance of the fourth converter control function 126 (i.e., is running a version of the fourth converter control function that under normal conditions is in control of the operation of the fourth power converter 106), and an eighth digital controller 128 which is running a standby instance of the fourth converter control function 130.

The fifth, sixth, seventh and eighth digital controllers 116, 120, 124, 128 are similarly part of another digital control system.

The fifth digital controller 116 additionally runs an active instance of a second converter station control function 132 which, in use, generates station control data to control operation of the second converter station 14, as well as running an active instance of another master power control function 134 which, in-use, generates power control data to control the power exchanged by the second converter station 14, i.e., the power the second converter station 14 exchanges with the first converter station 12. In this latter regard the active instance of the master control function 64 running on the first digital controller 46 within the first converter station 12 and the active instance of the other master control function 134 running on the fifth digital controller 116 within the second converter station 14 auto-negotiate a leader-follower arrangement, e.g. via an inter-station communication interface 78 such as a telecoms link, between the first and second converter stations 12, 14. The leader-follower arrangement can also, optionally, be changed by an operator command.

Additionally, the seventh digital controller 124 runs a standby instance of the second converter station control function 136, and a standby instance of the other master power control function 138.

Further to the above, the sixth digital controller 120 additionally runs a first deep standby instance of the second converter station control function 140, and a first deep standby instance of the other master power control function 142.

Finally in relation to the second converter station 14, eighth digital controller 128 runs a second deep standby instance of the second converter station control function 144, and a second deep standby instance of the other master power control function 146.

With respect to the second converter station 14, the standby, first deep standby, and second deep standby instances of the various control functions 122, 130, 136, 138, 140, 142, 144, 146 operate in a similar cascading manner to provide the same degrees of redundancy as the corresponding instances of the various control functions 52, 60, 66, 68, 70, 72, 74, 76 of the first converter station 12.

Additionally, the principle of using a set of four digital controllers per pair of power converters, with the set of digital controllers running the combination of active, standby, first deep standby, and second deep standby instances of the various required control functions described hereinabove, can be extended to more complex bipole power transmission schemes.

Figure 2:
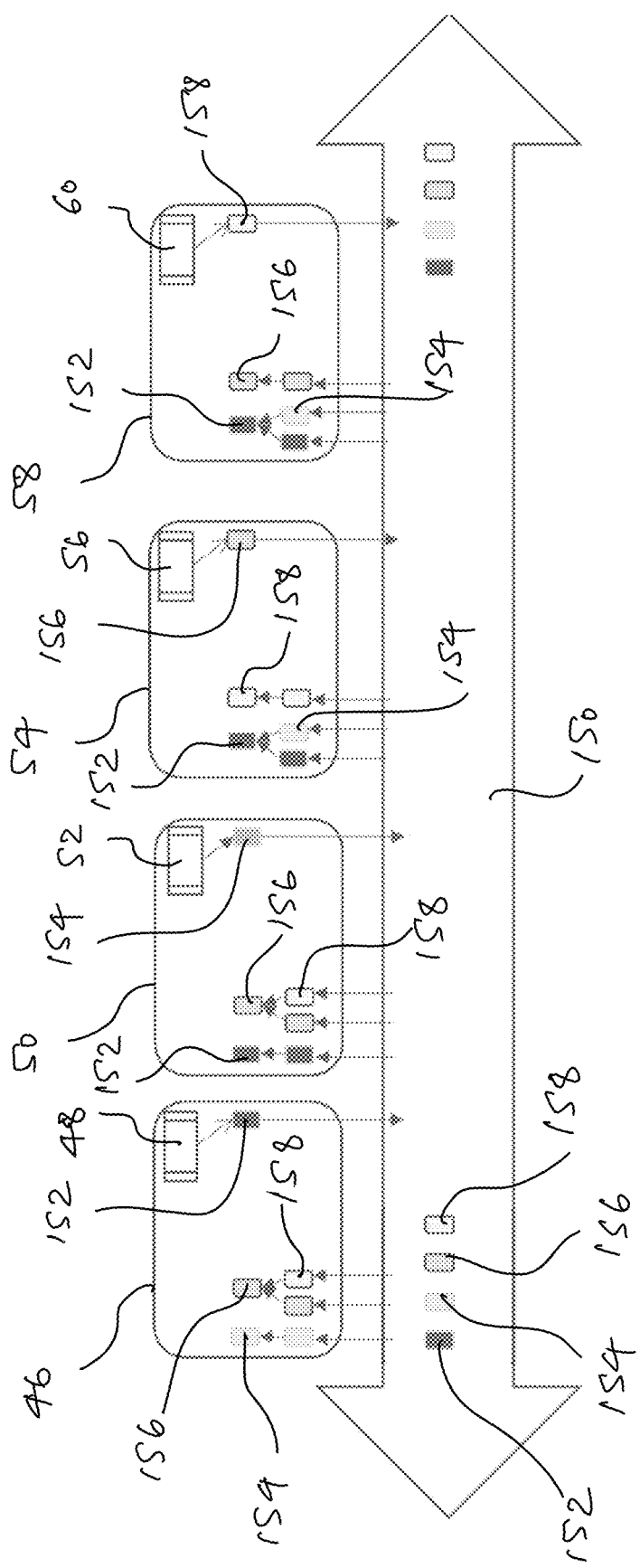
FIG. 2 shows a schematic view of how operational data is handled by digital controllers within the bipole power transmission scheme shown in FIG. 1.

Returning to the embodiment bipole power transmission scheme 10 shown in FIG. 1, the handling of operational data by the first, second, third and fourth digital controllers 46, 50, 54, 58 will now be considered in conjunction with FIG. 2.

The first, second, third and fourth digital controllers 46, 50, 54, 58 are interconnected with one another by a communication interface 150 (not shown in FIG. 1 and only shown schematically in FIG. 2).

Such interconnection allows:

the first digital controller 46 to share active first converter operational data 152, i.e. data on how the first power converter 26 is expected to operate according to the active instance of the first converter control function 48, with each of the other digital controllers 50, 54, 58;

the second digital controller 50 to share standby first converter operational data 154, i.e. data on how the first power converter 26 is expected to operate according to the standby instance of the first converter control function 52, with each of the other digital controllers 46, 54, 58;

the third digital controller 54 to share active second converter operational data 156, i.e. data on how the second power converter 36 is expected to operate according to the active instance of the second converter control function 56, with each of the other digital controllers 46, 50, 58; and the fourth digital controller 58 to share standby second converter operational data 158, i.e. data on how the second power converter 36 is expected to operate according to the standby instance of the second converter control function 60, with each of the other digital controllers 46, 50, 54.

Moreover, each of the digital controllers running an active instance of a converter control function 48, 56, i.e. each of the first and third digital controllers 46, 54, is configured to import the active operational data 152, 156 of the other digital controller 46, 54 running an active instance of a converter control function 48, 54. In other words, the first digital controller 46 is configured to import the active second converter operational data 156 shared by the third digital controller 54, while the third digital controller 54 is configured to import the active first converter operational data 152 shared by the first digital controller 46.

Meanwhile, each of the digital controllers running a standby instance of a converter control function 52, 60, i.e. each of the second and fourth digital controllers 50, 58, is configured to import the active operational data 152, 156 of each of the digital controllers running an active instance of a converter control function 48, 56, i.e. the active operational data 152, 156 of each of the first and third digital controllers 46, 54. Accordingly, the second digital controller 50 is configured to import each of the active first converter operational data 152 and the active second converter operational data 156, and the fourth digital controller 58 is similarly configured to import each of the active first converter operational data 152 and the active second converter operational data 156.

In addition each of the digital controllers running the active instance of a converter control function 48, 56, i.e. each of the first and third digital controllers 46, 54, is also configured to import the standby operational data 154, 158 of the standby instance of the same converter control function 52, 60. In other words, the first digital controller 46 is configured to import the standby first converter operational data 154 shared by the second digital controller 50, while the third digital controller 54 is configured to import the standby second converter operational data 158 shared by the fourth digital controller 58.

Figure 3:
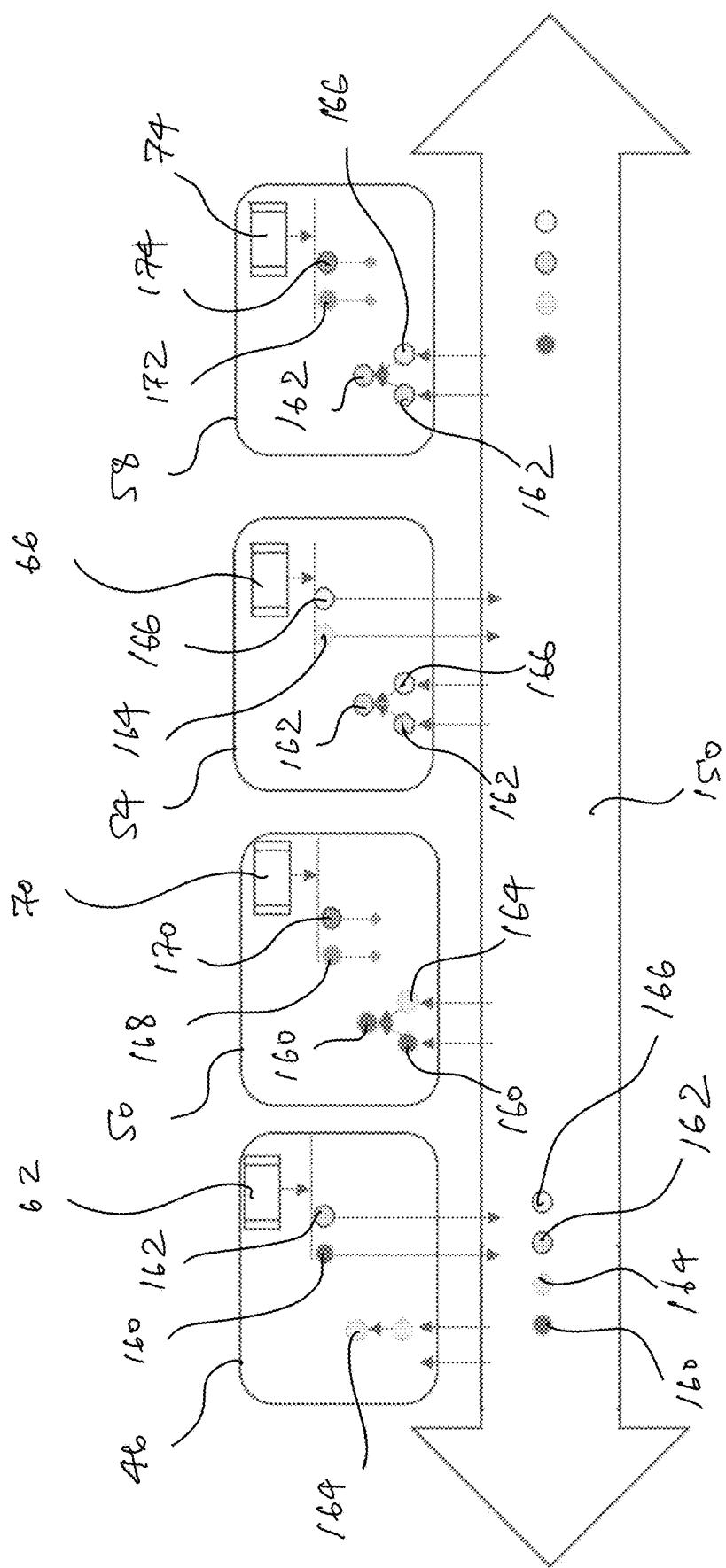
FIG. 3 shows a schematic view of how control data is handled by digital controllers within the bipole power transmission scheme shown in FIG. 1.

The handling of control data by the first, second, third and fourth digital controllers 46, 50, 54, 58 will now be considered, in conjunction with FIG. 3.

The digital controller running the active instance of the first converter station control function 62, i.e. the first digital controller 46, generates station control data in the form of active first converter control data 160 and active second converter control data 162 that the first and second power converters 26, 36 are respectively required to follow.

The first digital controller 46 then shares, via the communication interface 150, its generated active first converter control data 160 and active second converter control data 162 with each of the other digital controllers, i.e. with each of the second, third and fourth digital controllers 50, 54, 58.

The digital controller running the standby instance of the first converter station control function 66, i.e. the third digital controller 54, generates station control data in the form of standby first converter control data 164 and standby second converter control data 166, and then shares, via the communication interface 150, these generated standby first and second converter control data 164, 166 with each of the other digital controllers, i.e. with each of the first, second and fourth digital controllers 46, 50, 58.

The first digital controller 46, i.e. the digital controller running the active instance of the first converter station control function 62, is also configured to import the standby converter control data for the power converter it is running a converter control function for, i.e. is configured to import the standby first converter control data 164 for the first power converter 26 it is running the active first converter control function 48 for.

In addition to the foregoing, each digital controller running a deep standby instance of the first converter station control function, i.e. each of the second digital controller 50 running the first deep standby instance of the first converter station control function 70 and the fourth digital controller 58 running a second deep standby instance of the first converter station control function 74, generates station control data in the form of deep standby first converter control data and deep standby second converter control data.

More particularly, the second digital controller 50 generates station control data in the form of first deep standby first converter control data 168 and first deep standby second converter control data 170, and the fourth digital controller 58 generates station control data in the form of second deep standby first converter control data 170 and second deep standby second converter control data 174.

Each of the second and fourth digital controllers 50, 58 suppress, however, their respective generated deep standby first converter control data 168, 172 and deep standby second converter control data 170, 174.

Meanwhile, the digital controllers running the standby instance of the first converter station control function 66 and each of the first and second deep standby instances of the first converter station control function 70, 74, i.e. the third, second and fourth digital controllers 54, 50, 58, is each configured to import the active and standby converter control data 160, 162, 164, 166 for the power converter 26, 36 it is running a converter control function 52, 56, 60 for.

In other words:
the third digital controller 54 is configured to import the active second converter control data 162 and the standby second converter control data 166 for the second power converter 36 it is running the active second converter control function 56 for;
the second digital controller 50 is configured to import the active first converter control data 160 and the standby first converter control data 164 for the first power converter 26 it is running the standby first converter control function 52 for; and
the fourth digital controller 58 is configured to import the active second converter control data 162 and the standby second converter control data 166 for the second power converter 36 it is running the standby second converter control function 60 for.

Additionally, the digital controllers running the standby instance of the first converter station control function 66 and each of the first and second deep standby instances of the first converter station control function 70, 74, i.e. the third, second and fourth digital controllers 54, 50, 58, is each configured to utilise the corresponding imported active converter control data 160, 162 for subsequent processing.

There now follows a discussion of how the first, second, third and fourth digital controllers 46, 50, 54, 58 handle power control data.

The digital controller running the active instance of the master power control function 64, i.e. the first digital controller 46, generates power control data (not shown) in the form of active first converter power control data, active second converter power control data, active third converter power control data, and active fourth converter power control data that the first and second power converters 26, 36 and third and fourth power converters 96, 106 in the second converter station 14 are respectively required to follow.

The first digital controller 46, i.e. the digital controller running the active instance of the master power control function 64, shares via the inter-station communication interface 78 its generated active first converter power control data, active second converter power control data, active third converter power control data, and active fourth converter power control data with each of the other digital controllers, i.e. with the second, third and fourth digital controllers 50, 54, 58 in the first converter station 12, as well as with the further corresponding digital controllers in the second converter station 14, i.e. as well as with the fifth, sixth, seventh and eighth digital controllers 116, 120, 124, 128.

In addition, the digital controller running the standby instance of the master power control function 68, i.e. the third digital controller 54, generates power control data (also not shown) in the form of standby first converter power control data, standby second converter power control data, standby third converter power control data, and standby fourth converter power control data.

The third digital controller 54, i.e. the digital controller running the standby instance of the master power control function 68, shares via the inter-station communication interface 78 its generated standby first converter power control data, standby second converter power control data, standby third converter power control data, and standby fourth converter power control data with each of the other digital controllers, i.e. with the second, third and fourth digital controllers 50, 54, 58 in the first converter station 12, and the further corresponding digital controllers in the second converter station 14, i.e. and the fifth, sixth, seventh and eighth digital controllers 116, 120, 124, 128.

Each of the digital controllers running a deep standby instance of the master power control function 72, 76, i.e. each of the second and fourth digital controllers 50, 58, generate power control data in the form of respective first and second deep standby first converter power control data, respective first and second deep standby second converter power control data, respective first and second deep standby third converter power control data, and respective first and second deep standby fourth converter power control data.

The second and fourth digital controllers 50, 58 suppress these respective generated deep standby first converter power control data, deep standby second converter power control data, deep standby third converter power control data, and deep standby fourth converter power control data.

We claim:

1. A bipole power transmission scheme, comprising:
   at least a first converter station positioned in-use separate from at least a second converter station, and at least first and second transmission conduits and a first return conduit to in-use interconnect the first converter station with the second converter station and thereby permit the transfer of power between the first and second converter stations,
   the first converter station including:
   a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
   a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
   a first digital controller running an active instance of the first converter control function;
   a second digital controller running a standby instance of the first converter control function;
   a third digital controller running an active instance of the second converter control function; and
   a fourth digital controller running a standby instance of the second converter control function,
   one of the first, second, third and fourth digital controllers additionally running an active instance of a first converter station control function which generates station control data to control operation of the first converter station, and another of the first, second, third and fourth digital controllers additionally running a standby instance of the first converter station control function,
   the first, second, third and fourth digital controllers being interconnected with one another by a communication interface whereby the first digital controller is able to share active first converter operational data with each of the other digital controllers, the second digital controller is able to share standby first converter operational data with each of the other digital controllers, the third digital controller is able to share active second converter operational data with each of the other digital controllers, and the fourth digital controller is able to share standby second converter operational data with each of the other digital controllers,
   wherein each of the digital controllers running an active instance of a converter control function is configured to import the active operational data of the other digital controller running an active instance of a converter control function, and
   each of the digital controllers running a standby instance of a converter control function is configured to import the active operational data of each of the digital controllers running an active instance of a converter control function.

2. A bipole power transmission scheme according to claim 1, wherein each of the digital controllers running an active instance of a converter control function is also configured to import the standby operational data of the standby instance of the same converter control function.

3. A bipole power transmission scheme according to claim 1, wherein:
   the digital controller running the active instance of the first converter station control function generates station control data in the form of active first converter control data and active second converter control data that the first and second power converters are respectively required to follow, and the digital controller running the standby instance of the first converter station control function generates station control data in the form of standby first converter control data and standby second converter control data, and
   the digital controller running the active instance of the first converter station control function shares via the communication interface its generated active first converter control data and active second converter control data with each of the other digital controllers, and the digital controller running the standby instance of the first converter station control function shares via the communication interface its generated standby first converter control data and standby second converter control data with each of the other digital controllers.

4. A bipole power transmission scheme according to claim 3, wherein the digital controller running the active instance of the first converter station control function is configured to import the standby converter control data for the power converter it is running a converter control function for.

5. A bipole power transmission scheme according to claim 1, wherein at least one of the first, second, third and fourth digital controllers additionally runs a deep standby instance of the first converter station control function, the or each digital controller running a deep standby instance of the first converter station control function generating station control data in the form of deep standby first converter control data and deep standby second converter control data, the or such digital controller suppressing their respective generated deep standby first converter control data and deep standby second converter control data.

6. A bipole power transmission scheme according to claim 5, wherein the digital controllers running the standby instance of the first converter station control function and the or each deep standby instance of the first converter station control function is each configured to import the active and standby converter control data for the power converter it is running a converter control function for.

7. A bipole power transmission scheme according to claim 6, wherein the digital controllers running the standby instance of the first converter station control function and the or each deep standby instance of the first converter station control function is each configured to utilise the imported active converter control data for subsequent processing.

8. A bipole power transmission scheme according to claim 1, wherein one of the first, second, third and fourth digital controllers additionally runs an active instance of a master power control function which generates power control data to in-use control the power exchanged by the first converter station, and another of the first, second, third and fourth digital controllers additionally runs a standby instance of the master power control function.

9. A bipole power transmission scheme according to claim 8, wherein:
the digital controller running the active instance of the master power control function generates power control data in the form of active first converter power control data, active second converter power control data, active third converter power control data, and active fourth converter power control data that the first and second power converters and third and fourth power converters in a second converter station are respectively required to follow, and
the digital controller running the standby instance of the master power control function generates power control data in the form of standby first converter power control data, standby second converter power control data, standby third converter power control data, and standby fourth converter power control data.

10. A bipole power transmission scheme according to claim 9, wherein:
the digital controller running the active instance of the master power control function shares via an inter-station communication interface its generated active first converter power control data, active second converter power control data, active third converter power control data, and active fourth converter power control data with each of the other digital controllers and further corresponding digital controllers in the second converter station, and the digital controller running the standby instance of the master power control function shares via the inter-station communication interface its generated standby first converter power control data, standby second converter power control data, standby third converter power control data, and standby fourth converter power control data with each of the other digital controllers and the further corresponding digital controllers in the second converter station.

11. A bipole power transmission scheme according to claim 10, wherein at least one of the first, second, third and fourth digital controllers additionally runs a deep standby instance of the master power control function, the or each digital controller running a deep standby instance of the master power control function generating power control data in the form of deep standby first converter power control data, deep standby second converter power control data, deep standby third converter power control data, and deep standby fourth converter power control data, the or each such digital controller suppressing their respective generated deep standby first converter power control data, deep standby second converter power control data, deep standby third converter power control data, and deep standby fourth converter power control data.

12. A method of operating a bipole power transmission scheme, comprising:
at least a first converter station positioned in-use separate from at least a second converter station, and at least first and second transmission conduits and a first return conduit to in-use interconnect the first converter station with the second converter station and thereby permit the transfer of power between the first and second converter stations,
the first converter station including:
a first power converter having a first DC terminal connected with the first transmission conduit, a second DC terminal connected with the first return conduit, and at least one first AC terminal for connection with a first AC network element, operation of the first power converter to transfer power between the first transmission conduit and the first AC network element being controlled by a first converter control function;
a second power converter having a third DC terminal connected with the first return conduit, a fourth DC terminal connected with the second transmission conduit, and at least one second AC terminal for connection with a second AC network element, operation of the second power converter to transfer power between the second transmission conduit and the second AC network element being controlled by a second converter control function;
a first digital controller running an active instance of the first converter control function;
a second digital controller running a standby instance of the first converter control function;
a third digital controller running an active instance of the second converter control function; and
a fourth digital controller running a standby instance of the second converter control function,
one of the first, second, third and fourth digital controllers additionally running an active instance of a first converter station control function which generates station control data to control operation of the first converter station, and another of the first, second and third and fourth digital controllers additionally running a standby instance of the first converter station control function, the first, second, third and fourth digital controllers being interconnected with one another by a communication interface whereby the first digital controller is able to share active first converter operational data with each of the other digital controllers, the second digital controller is able to share standby first converter operational data with each of the other digital controllers, the third digital controller is able to share active second converter operational data with each of the other digital controllers, and the fourth digital controller is able to share standby second converter operational data with each of the other digital controllers, the method of the invention comprising the steps of:

(a) configuring each of the digital controllers running an active instance of a converter control function to import the active operational data of the other digital controller running an active instance of a converter control function, and (b) configuring each of the digital controllers running a standby instance of a converter control function to import the active operational data of each of the digital controllers running an active instance of a converter control function.

* * * * *